United States Patent
Wirtz et al.

(10) Patent No.: US 6,259,803 B1
(45) Date of Patent: Jul. 10, 2001

(54) SIMPLIFIED IMAGE CORRELATION METHOD USING OFF-THE-SHELF SIGNAL PROCESSORS TO EXTRACT EDGE INFORMATION USING ONLY SPATIAL DATA

(75) Inventors: Michael M. Wirtz; William R. Ditzler, both of Ridgecrest, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/337,219

(22) Filed: Jun. 7, 1999

(51) Int. Cl.$^7$ .............................. G06K 9/00; G01C 21/00; G01C 3/08
(52) U.S. Cl. ......................... 382/103; 382/199; 701/223; 356/4.01
(58) Field of Search .................................. 382/103, 199; 701/223; 356/4.01

(56) References Cited

U.S. PATENT DOCUMENTS

| | | | |
|---|---|---|---|
| 4,835,532 | * | 5/1989 | Fant . |
| 5,640,468 | * | 6/1997 | Hsu ....................................... 382/103 |

* cited by examiner

Primary Examiner—Stephen C. Buczinski
(74) Attorney, Agent, or Firm—Earl H. Baugher, Jr.

(57) ABSTRACT

Provided is an approach to efficiently correlate a previously captured digitally created image to one provided in real-time. The real-time digitally created image is represented by the digitally processed image of just the edges of objects within a scene. This is accomplished via digital edge extraction and subsequent digital data compression, based on comparing only the spatial differences (e.g., range values) among pixels. That is, digital data representative of signal intensity are not used. An application is the efficient correlation of real-time digitally processed 3-D images generated from laser scans, in particular, scans of laser "radars" or LADARS. The process simplifies and improves on conventional techniques by iterating three sequential steps. A "hard" edge or a corner of an object is detected via a "corner-detector" algorithm that assigns a raw edge-strength value to each pixel in the image digitally created from the LADAR return. This is accomplished via a spatial numerical second-derivative operation performed on only the range value (distance from the LADAR to a specific location on an object scanned by the LADAR) assigned to each pixel's neighboring pixels. Next, all edge-strength values greater than a pre-specified value representative of that obtained by a laser (light) reflection from a right angle (90°), i.e., a hard edge or a corner, are reset to the pre-specified edge-strength value. If this second step were omitted, the image correlation process would be dominated by large edge-strength values representative of actual discontinuities in an adjacent pixel's range value, such as those produced when a tall object (building, vehicle, or promontory) shadows the area behind it from a laser scanning it obliquely. Finally, when a discontinuity in range values between two adjacent pixels is detected, the edge-strength value of the pixel representing the larger range value is set to zero. This last step validates the perspective transformation from an oblique view to an overhead view by avoiding the designation of a strong "phantom edge" on the ground. This phantom edge results from the laser beam forming a "shadow" when obliquely radiating a tall vertical object. The data needed to accomplish this correlation are minimized for subsequent storage and manipulation by storing only the two end points of the straight lines digitally generated to depict the edges of objects within a scene. This simple method, using inexpensive commercial off-the-shelf signal processors, enables reliable real-time identification of objects by comparison to a previously obtained reconnaissance library of digital images that have been stored for the purpose of future targeting. To enable each object in this library of digital images to be efficiently stored in memory, each digital image is defined by a greatly reduced and then compressed data set. Using this method, object identification may be accomplished quickly and reliably during such time-critical events as the terminal portion of a guided weapon's trajectory.

9 Claims, 4 Drawing Sheets

SIMPLIFIED IMAGE CORRELATION METHOD USING OFF-THE-SHELF SIGNAL PROCESSORS TO EXTRACT EDGE INFORMATION USING ONLY SPATIAL DATA

STATEMENT OF GOVERNMENT INTEREST

The invention described herein may be manufactured and used by or for the Government of the United States of America for Governmental purposes without the payment of any royalties thereon or therefore.

BACKGROUND OF THE INVENTION

1. Field of the Invention

The field to which this invention applies is image correlation, in particular, correlation using only data that represents spatial parameters. A specific application is correlation of digitally processed data obtained from a scanning laser such as a LADAR.

2. Background

It is known to use multispectral image correlation systems in air-to-ground target detection and acquisition. Such systems include means for image-processing, which automatically register images produced by airborne platform-mounted sensors operating in different wavelengths and from different points of view.

It is further known that an effective technique for registering images from different sensor types is that of edge matching, that is, matching pronounced target scene edges appearing in one sensor image with similar target scene edges appearing in one or more other sensor images. However, conventional image processing techniques for edge extraction rely upon detection of discontinuities in the light intensity of adjacent pixels, which often produces unsatisfactory results because of reflected laser energy which exhibits large random fluctuations from pixel to pixel, because of atmospheric effects, surface texture, and receiver noise. Such random fluctuations can overwhelm systematic variations caused by the reflectance of the target.

Accordingly, there is a need for a method and system for target detection acquisition, and terminal guidance, utilizing edge extraction from laser-radar (ladar) images relying solely on spatial information, rather than light intensity data.

SUMMARY OF THE INVENTION

It is, therefore, an object of the invention to provide a method for enhancing air-to-ground target detection, acquisition and terminal guidance, utilizing only spatial parameters of data for edge extraction from laser-radar images.

A further object of the invention is to provide an image correlation system for correlating edge information from a recorded and stored template of a target scene with current real-time images from laser-radar sensors mounted on an airborne platform, the system operating to provide edge information from the sensor images based upon a comparison of the range of a pixel with each of its neighboring.

With the above and other objects in view, as will hereinafter appear, a feature of the invention is the provision of a method for enhancing air-to-ground target detection, acquisition, and terminal guidance, the method comprising the steps of (1) providing a reference image of a target scene with a designated selected target therein, (2) detecting contract boundaries and orientation thereof in the reference image, (3) identifying maxima edge pixels in the reference image determined by contract boundaries and tracing edges along the maxima edge pixels, to provide a reference image template, (4) translating points in the reference image to points in three-dimensional space, and compressing the reference image by fitting straight line segments to the reference image edges, and storing in a computer memory only end points of the straight line segments, the compressed data represented by end points of the line segments thus constituting a reference image in a library of reference images, (5) providing video image of the target scene from a sensor, such as a LADAR, mounted on an airborne platform, (6) determining a range value for each pixel in the video image and computing a gradient based edge strength value for each pixel based only upon the range value thereof, (7) transforming the range values from the video image and scaling them to that of the reference image having the same perspective, range, and scale to that of the reference image template, (8) correlating the transformed and scaled edges of the video image with the above reference image, and (9) overlaying the above reference image upon the video image, thus providing an enhanced video image of a pre-specified target as part of the video image.

In accordance with a further feature of the invention, there is provided a multispectral image correlation system, a library of reference images containing compressed data defining the pertinent edges within a three-dimensional space containing a pre-specified target, the target defined by a tracing along the most pronounced of the target's edges, a laser-radar (LADAR) sensor mounted on an airborne platform for providing real-time LADAR imagery of the target scene, means for determining a range value for each pixel comprising the LADAR imagery and for computing gradient based edge-strength values for each based only upon a range value thereof, and for thereby identifying the presence of a structural 90° corner. The system further includes means for resetting all edge-strength values greater than a first value resultant from a reflection off the 90° corner to that the first value, means for resetting to zero the range value of any pixel adjacent another pixel having a shorter range value to identify a structural edge traced by the range values of those pixels exhibiting the first value, means for correlating the structural edge traced by the range values of those pixels exhibiting the first value, means for correlating the structural edge identified by the LADAR imagery with the appropriate reference imagery, and means for overlaying the pre-selected target from the appropriate reference image upon the LADAR imagery, to provide enhanced LADAR imagery to identify the pre-selected target therein.

The above and other features of the invention, including various novel details of method steps, arrangements, and combinations of parts will now be more particularly described with reference to the accompanying drawings and pointed out in the claims. It will be understood that the particular method steps and devices embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which are shown illustrative embodiments of the invention, from which its novel features and advantages will be apparent, and wherein.

DESCRIPTION OF PREFERRED EMBODIMENTS

Figure 1:
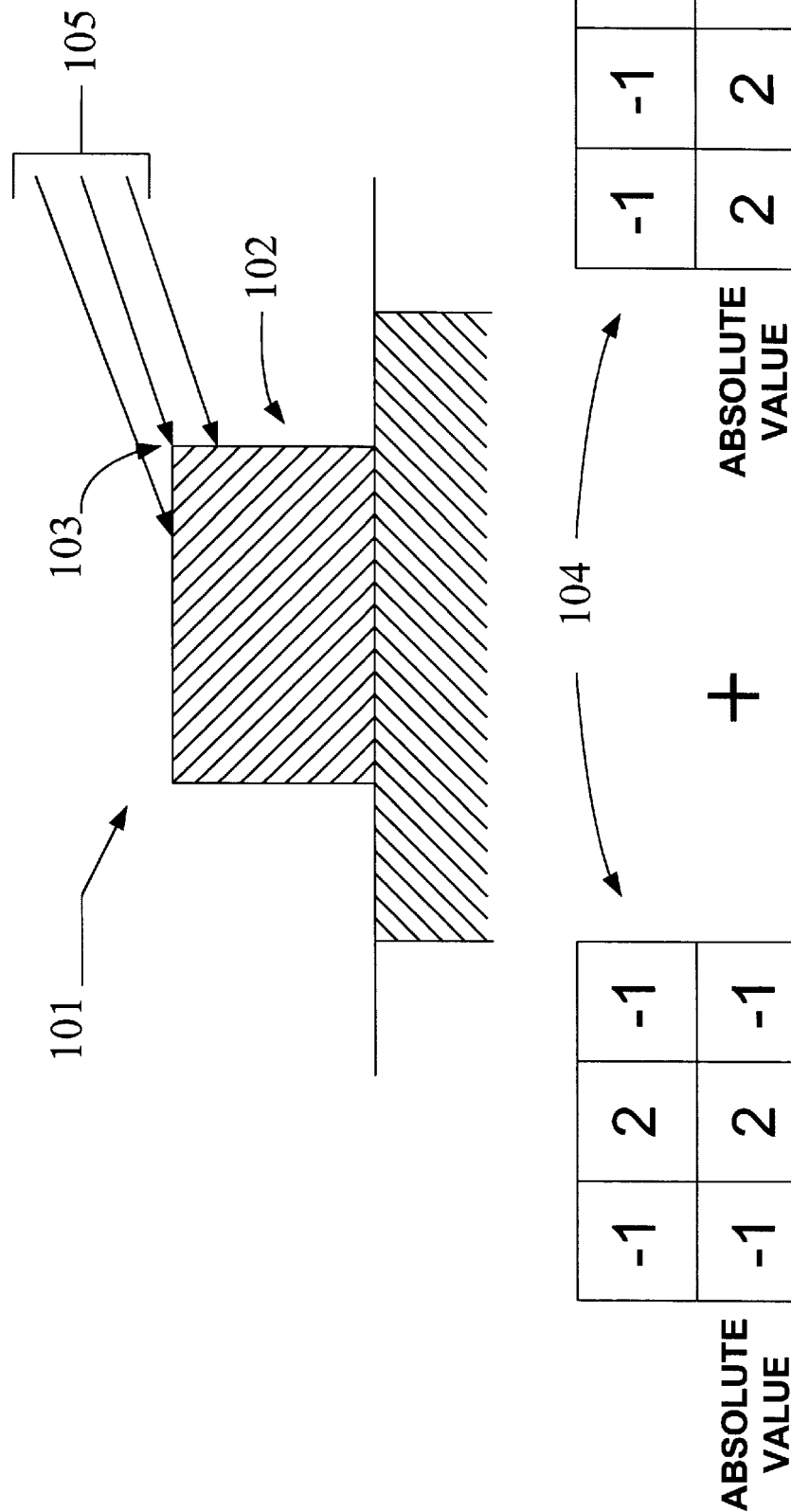
FIG. 1 depicts oblique illumination of a corner of an object by an energy source and the two 3×3 arrays (e.g., length X width and width X depth) used to digitally represent the 3-D relationship of a pixel to each of its neighboring pixels within the image reflected from the oblique illumination of the corner of the object.
Figure 2:
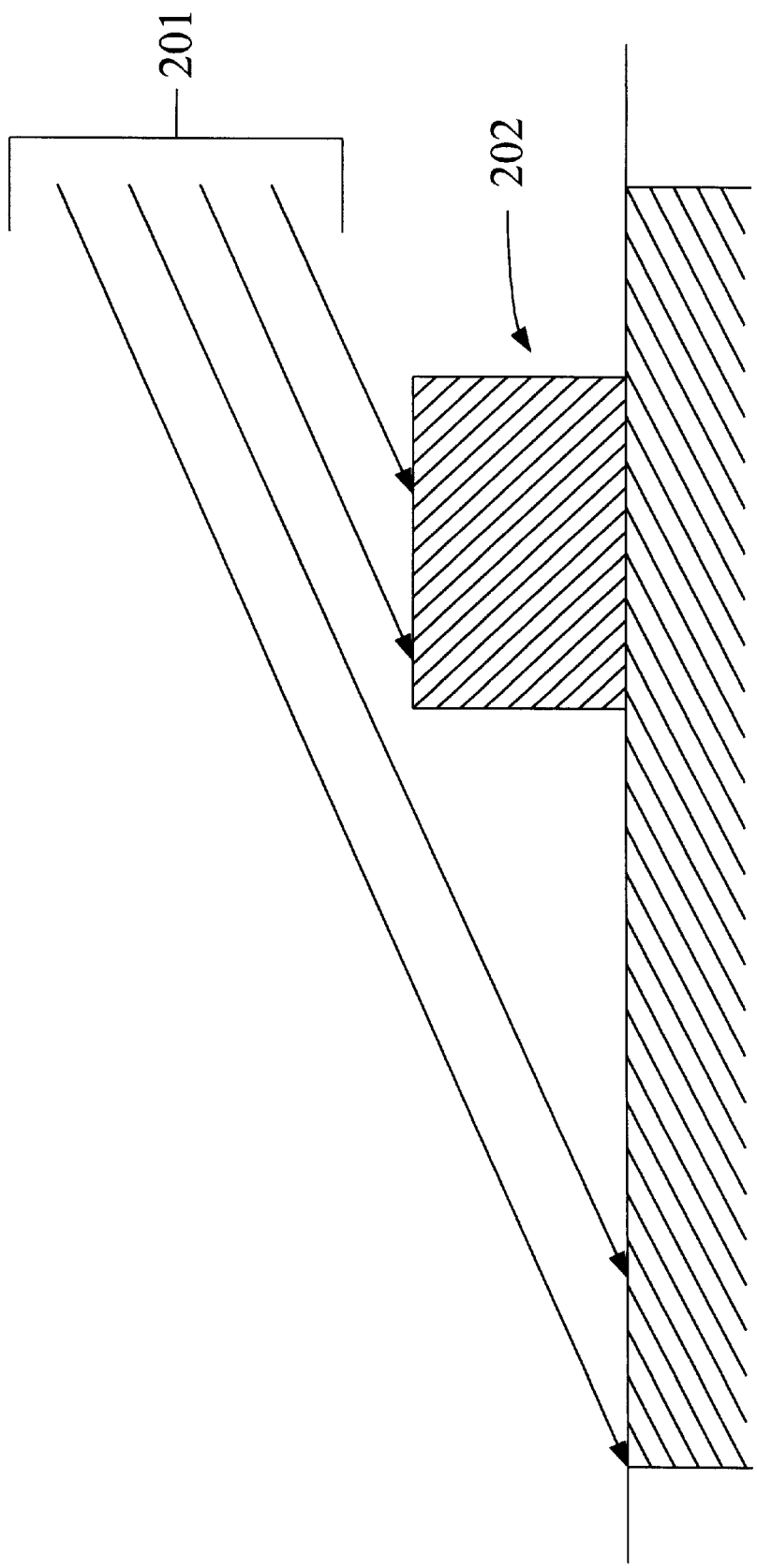
FIG. 2 depicts an oblique illumination of an object in which only an edge of the object, not a corner, is illuminated, to include some additional illumination of an area behind the object.
Figure 3:
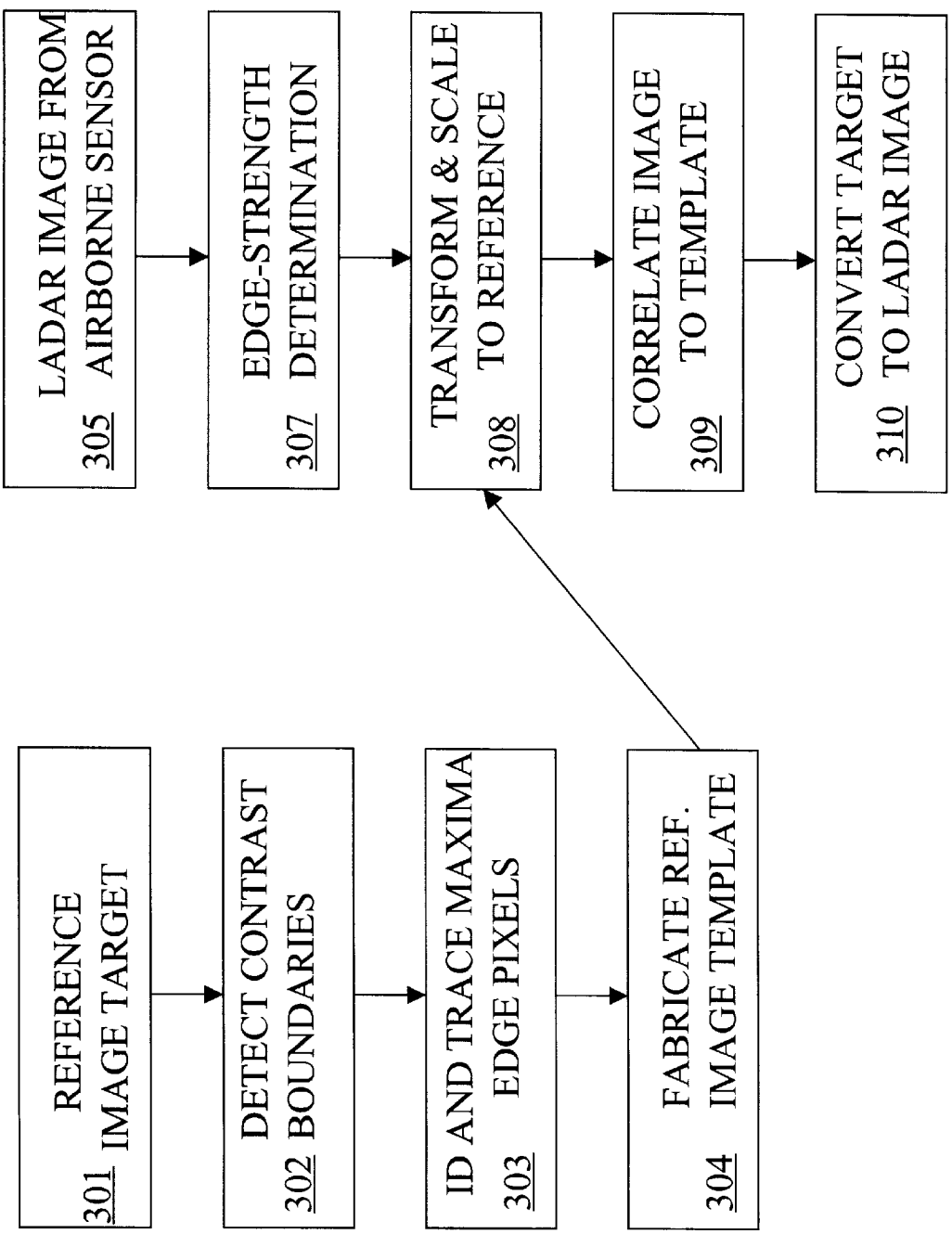
FIG. 3 is a flow chart depicting a preferred method illustrative of an embodiment of the invention.

Refers to FIGS. 1 and 2. In accordance with a preferred embodiment of the invention (FIG. 3), there is provided a digitized reference image 301 of a target scene 101 with a selected target 102 designated therein. The reference image 301 is produced in advance of a mission directed toward a real target 202 that may be digitally recreated by processing reflections from an illumination 201 in real time at an oblique angle over a flat surface of the real target 202. Assuming up-to-date reconnaissance, the digitally recreated real target 202 should correspond to the stored target 102, digitally recreated from an illumination 105 of only well-defined edges, including a corner 103, and stored as a reference image 301.

A spatial gradient operation 302 detects contrast boundaries in the reference image 301 and their orientation, with a set of convolution kernels. A Sobel operation (not separately shown) is a preferred means for effecting the gradient operation 302.

Maxima edge pixels 303 in the reference image 301, as defined to exist along contrast boundaries 302 are identified. Edges along the maxima edge pixels 303 are traced.

A reference image template 401 is fabricated 304 by fitting straight line segments to the reference image 301 edges, where data exist to make this possible. The data representing the line segments thus generated are compressed by storing in memory only the end points of the straight-line segments. If three-dimensional information relative to the reference target scene image is available, such as a terrain elevation database, the 3D information is used to connect the stored end points to points in three-dimensional space. Otherwise, the end points are assigned a value of zero for the third dimension. All of the data relative to of digitally recreated targets 102 known to exist within digitally recreated target scenes 101 are contained in lists of straight line segment end points (not separately shown) that constitute a library of reference image templates 401.

A laser-radar (LADAR) video image 305 of the target scene 101 is provided by a system (not separately shown) mounted on an airborne platform, such as an aircraft, a missile, or other vehicle or weapon. An inherent advantage of LADAR is its provision of a three dimensional image. Every pixel in the LADAR image contains the range to the points on the object from which the laser beam is reflected. The full cartesian coordinate of each pixel can be reproduced digitally. Thus, the LADAR data readily can be used with the digitally recreated image from another sensor, permitting views of the scene 101 from a number of perspectives.

Accordingly, a range value for each pixel in the LADAR image is determined and a gradient based edge strength value 306 is computed. A spatial numerical second derivative operator is employed to assign a raw edge-strength value to each pixel as it relates to the range value of each of its neighboring pixels. This provides a digital representation of the response from any illumination 105 of a target 102, e.g., an illumination as depicted in the illumination 105 of the corner 103 in FIG. 1.

All computed edge-strength values greater than that value representative of a response from a corner are reset to that value. Since the second derivative operator specifically highlights differences in any response due to the illumination of the intersection of multiple edges, i.e., at a corner of the target 102, range value discontinuities at the corner establish distinct value differences among neighboring pixels, thus the operation is termed "corner detecting," and the function operates as a "corner detector". Thus, this spatial numerical second derivative operation on the received LADAR image data provides, with minimal transformation and data manipulation, a "best" correlation of a possible target 102 within the scene 101. Without this step, the image correlation process would be dominated by the very large edge-strength values produced by actual discontinuities in adjacent range values. Such discontinuities are produced when a vertical object, such as a building or vehicle, shadows the ground behind it from an oblique laser beam.

When a range discontinuity is detected between two adjacent pixels, the edge strength of the pixel with the larger range value is set to zero 307. Without this step, perspective transformations from an oblique to an overhead view would result in a phantom edge on the ground where a vertical obstacle shadowed the laser beam. This "edge" would not correspond to any physical object that may be identified by another means.

The LADAR video image is then transformed 308 to the perspective and range, while scaling 308 to the reference image template 401. Next, a correlation 309 of the transformed and scaled edges of the LADAR image is made to the edges of the reference image template 401.

Finally, an overlay 310 of the designated target in the reference image template 401 is placed on to the LADAR video image.

The above-described process has been demonstrated to reliably extract edges from LADAR images of typical air-to-ground targets, which are then registered with target images from reconnaissance assets. The LADAR data is processed within the time available for terminal guidance in current precision-guided weapons, utilizing commercial off the shelf (COTS) low-cost signal processors.

Figure 4:
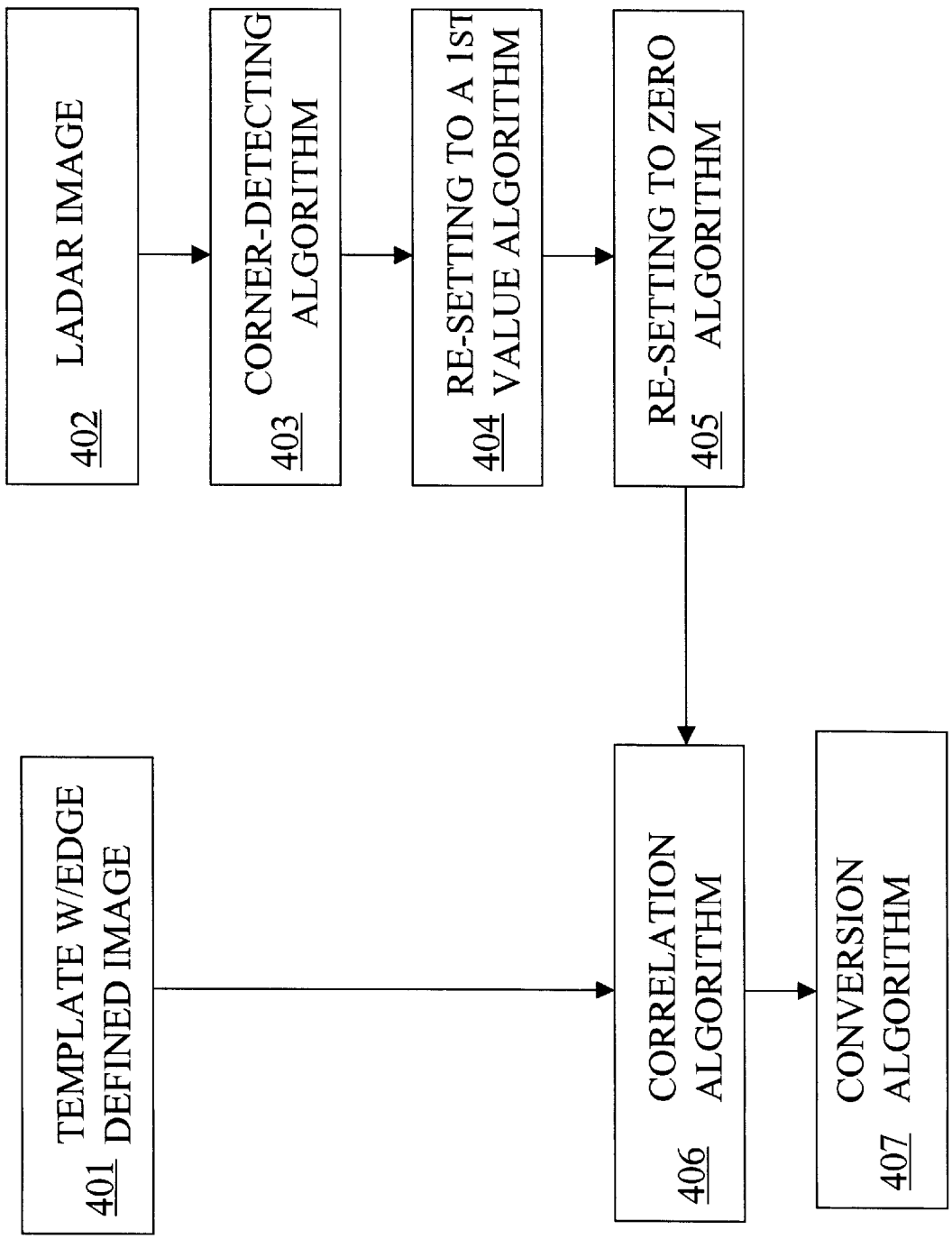
FIG. 4 is a flow chart representing an alternative preferred embodiment of the invention.

Refer to FIG. 4. There is provided a multispectral image correlation system for carrying out the above-described method. The system includes storage 401, such as computer memory, for the reference template 401 that contains compressed data representing reference imagery of a three dimensional target scene with target(s) designated therein. The template 401 comprises a tracing of the most pronounced of the scene's edges.

The system further includes a laser-radar (LADAR) system 402 mounted on an airborne platform for providing LADAR imagery of the target scene.

A first algorithm 403 determines a range value for each pixel in the LADAR image 305 and computes gradient based edge-strength values, based on these range values, for each pixel. A second algorithm 404 after comparing this computed edge-strength value for each pixel to that edge-strength value computed for each of its neighboring pixels, generates a pair of 3×3 matrices 104. These matrices depict the relationship of that pixel to each of its neighboring pixels in each of two intersecting planes. A certain set of values in the matrices 104, as provided in FIG. 1, indicates the position of that pixel at a corner of an object 102, in turn, helping to quickly and reliably identify specific objects based on correlation to known objects in the scene. This identification of corners of objects in a scene is facilitated by setting all edge-strength values greater than a first value determined to be representative of a pixel's position at a corner to that first value. Further, a third algorithm 405 sets to zero the range value of a pixel adjacent to any pixel having a range value smaller than its range value. This provides the minimum data needed to trace a structural edge, using just those pixels assigned that first value. The data necessary to maintain a record of objects within a scene are compressed further by storing only the end points of a straight line used to define each edge as determined from the above.

A fourth algorithm 406 facilitates correlation of the structural edges identified in the LADAR image 305 with the stored traced edges of the reference image template 401. The correlation done by the fourth algorithm 406 requires transforming the compressed "edge data" from the LADAR image 305 in range only for each perspective taken and scaling the LADAR image 305 edge data to that of the reference template 401. A fifth algorithm 407 permits the overlay of pre-specified target(s) within the stored reference image template 401 upon the real-time LADAR image 305 to enhance real-time identification and provide precise location of the pre-specified target(s) in relation to a weapon system.

There is thus provided a method and system for enhancing air-to-ground target detection, acquisition, and terminal guidance, utilizing edge extraction from LADAR images 305 that are processed using a minimal data set comprising only spatial (range value) relationships.

It is to be understood that many changes in the details and arrangements of method steps and parts, which have been herein described and illustrated in order to explain the nature of the invention, may be made by those skilled in the art within the principles and scope of the invention as expressed in the appended claims.

What is claimed is:

1. A method for designating a target comprising:
    establishing a reference image template comprised of a first set of pixels that may be represented by a first data set of points in at least one plane;
    capturing said first data set in a manner that defines contrast boundaries of said reference image template and orientation thereof;
    identifying data obtained from only those said pixels determined to be maxima edge pixels as a limited data set of said first data set of said pixels;
    tracing edges along said limited data set to establish a data set of edges;
    compressing said second data set by fitting straight line segments, each having first and second end points, to said data set of edges and storing in memory only said end points;
    converting said data set of edges to at least one second data set to be represented in three-dimensional space;
    providing a real-time image comprising a second set of pixels;
    establishing a range value for each said pixel in said real time image;
    based only on said range values, computing a gradient based edge-strength value for each said pixel in said real time image;
    transforming said real time image perspective and range to that of said reference image template;
    scaling said real time image to that of said reference image template;
    correlating said scaled real time image to said reference image template;
    designating a target within said reference image template; and
    overlaying said designated target within said reference image template upon said real time image,
    wherein an enhanced image of said designated target is provided for use in real time applications.

2. The method in accordance with claim 1 wherein said data in said data sets are digital.

3. The method in accordance with claim 1 wherein said reference image template is produced in advance of a requirement for use in real time.

4. The method in accordance with claim 1 wherein said reference image template is produced from reconnaissance images.

5. The method in accordance with claim 1 wherein three-dimensional data representative of said reference image template is used to connect said end points in three-dimensional space.

6. The method in accordance with claim 1 wherein said end points of at least one said line segment may be assigned a third dimension of zero.

7. The method in accordance with claim 1 wherein said real time image is provided by a LADAR system.

8. The method in accordance with claim 1 wherein, a raw edge-strength value may be assigned to each said pixel to facilitate identification of a structural corner in said real time image, wherein all said edge-strength values greater than a value representative of a reflection from a corner of an object are reset to said value representative of a reflection from a corner of an object, and wherein upon detecting a range discontinuity between two adjacent said pixels, said edge-strength value of said pixel with the highest range value is set to zero.

9. A image correlation system comprising:
    a memory device for storing at least one template of at least one image of at least one pre-specified target, having edges at least one of which said edges is pronounced,
    wherein said at least one image of said at least one pre-specified target is captured in said at least one template by at least one tracing along said pronounced at least one edges;
    an imaging device for capturing in real time video images, comprising pixels, of at least one remote object;
    a computer for processing data on spatial relationships, wherein said processing identifies said remote objects by determining a range value for each of said pixels associated with said at least on remote object and computes at least one gradient based edge-strength value for each of said pixels associated with said at least one remote object;
    at least one algorithm that:
        resets at least one edge-strength value that is greater than a first value, said first value representative of a reflection from a corner, to said first value, resets to zero said range value of a first at least one said pixel that is adjacent at least one second said pixel, said second at least one pixel having a shorter range value than said first at least one pixel, wherein at least one structural edge of said at least one remote object is identified by tracing said pixels associated with said first value to establish an outline of said at least one object described by said at least one structural edge;

correlates said outline of said at least one object with said at least one image of said at least one pre-specified target in said stored template; and overlays said at least one pre-specified target in said stored template on said real time image of said at least one object, wherein said overlaying process enhances recognition of said pre-specified target in said real time image.

* * * * *